United States Patent [15] 3,642,434
Dwyer [45] Feb. 15, 1972

[54] PRODUCTION OF SYNTHETIC FAUJASITE

[72] Inventor: Francis G. Dwyer, Cherry Hill, N.J.
[73] Assignee: Mobil Oil Corporation
[22] Filed: Jan. 10, 1969
[21] Appl. No.: 790,454

[52] U.S. Cl. .............................................23/113, 260/448
[51] Int. Cl. ...........................................................C01b 33/28
[58] Field of Search ...............23/113, 112, 111; 260/448; 252/455

[56] References Cited

UNITED STATES PATENTS

| 2,882,244 | 4/1959 | Milton | 23/113 |
| 3,130,007 | 4/1964 | Breck | 23/113 |
| 3,306,922 | 2/1967 | Barrer et al. | 260/448 |
| 3,314,752 | 4/1967 | Kerr | 23/113 |
| 3,414,602 | 12/1968 | Acara | 260/448 |

FOREIGN PATENTS OR APPLICATIONS

| 1,117,568 | 6/1968 | Great Britain | 252/455 |

Primary Examiner—Edward J. Meros
Attorney—Oswald G. Hayes, Andrew L. Gaboriault, Raymond W. Barclay and James F. Woods

[57] ABSTRACT

Crystallization of synthetic faujasite from an aqueous reaction mixture comprising alkali metal oxide, silica, alumina, and water in specified molar ratios and tetramethyl ammonium ions which hasten the crystallization of the synthetic faujasite. Zeolite ZSM-4 is crystallized from the same reaction mixture by employing a longer crystallization time period.

6 Claims, No Drawings

PRODUCTION OF SYNTHETIC FAUJASITE

BACKGROUND OF THE INVENTION

1. Field of the Invention

This invention relates to the crystallization of faujasite and a zeolite known as ZSM-4. More particularly, this invention relates to a method for hastening the crystallization of faujasite from a crystallization environment suitable for crystallization of faujasite and to a method of obtaining the new zeolite ZSM-4 from a faujasite crystallization environment.

2. Discussion of the Prior Art

The crystallization of synthetic zeolites from reaction mixtures containing a source of silica, alumina and alkali is well known and has been described in numerous patents relating to preparation of specific zeolite species. Synthetic faujasite has been prepared by initially preparing a precursor solution containing silica, alumina, water and alkali metal oxide in specific ratios. Thereafter to the precursor solution is added silica and alumina to obtain a composition within the broad oxide mole ratios suitable for synthetic faujasite preparation. The reaction mixture forms a slurry and the synthetic faujasite is crystallized by heating the slurry.

ZSM-4 has been prepared by a process wherein a precursor solution is employed although the oxide mole ratios in the final product differ. Additionally, the preparation of ZSM-4 entails the use in the reaction mixture of a source of tetramethylammonium ion as ZSM-4 in its as synthesized form contains as part of the framework tetramethylammonium cations in addition to alkali metal cations to balance the electronegative valence of the aluminosilicate. It has become desirable to provide a reaction system suitable for use in preparing both synthetic faujasite and ZSM-4 both of which can be converted to valuable catalysts by subsequent ion exchange treatment. Additionally, it has become desirable to provide a method which hastens the crystallization of faujasite from a faujasite crystallization environment. Also it has been desired to provide a means for shifting the crystallization equilibrium of faujasite to zeolite P to a more valuable zeolite, namely ZSM-4.

SUMMARY OF THE INVENTION

Broadly, this invention contemplates a method for effecting the crystallization of a synthetic zeolite which comprises initially preparing a mixture of silica, alumina, alkali metal oxide and water having a composition, expressed in terms of mole ratios of oxides, within the following ranges:

| | |
|---|---|
| $SiO_2/Al_2O_3$ | 3 to 60 |
| Alkali Metal Oxide/$SiO_2$ | 0.1 to 0.7 |
| $H_2O$/Alkali Metal Oxide | 15 to 600 | thereafter including in said mixture a minor amount of tetramethylammonium ion, thereafter crystallizing faujasite.

In a particularly desirable embodiment, this invention contemplates a method for effecting the crystallization of multiple synthetic zeolites which comprises initially forming a precursor comprising a mixture of silica, alumina, water and alkali metal oxide having a composition, expressed in terms of mole ratios of oxides, as follows:

| | |
|---|---|
| $SiO_2/Al_2O_3$ | 2 to 40 |
| Alkali Metal Oxide/$SiO_2$ | 1 to 4 |
| $H_2O$/Alkali Metal Oxide | 10 to 60 | heating the mixture, thereafter adding thereto a source of tetramethylammonium cations, alumina, silica, water and sodium oxide such that the ratios are:

| | Broad | Preferred |
|---|---|---|
| $SiO_2/Al_2O_3$ | 3–60 | 6–30 |
| $R_2O$+alkali metal oxide/$SiO_2$ | .05–.90 | .15–.75 |
| $H_2O/R_2O$+alkali metal oxide | 15–600 | 20–150 |
| Alkali metal oxide/alkali metal oxide+$R_2O$ | 0.31–<1 | .75–.99 |

R = tetramethylammonium.

effecting crystallization of a synthetic faujasite from the resultant mixture and thereafter crystallizing a second zeolite from said reaction mixture and withdrawing said second zeolite. The second zeolite recovered is designated as ZSM-4 and is more fully described below. The faujasite can be removed after crystallization or left in the reaction vessel while ZSM-4 crystallizes.

DESCRIPTION OF SPECIFIC EMBODIMENTS

It has been found that by following the process outlined above both faujasite and ZSM-4 can be prepared from the same crystallization reaction mixture. It has also been found that the inclusion of a source of tetramethylammonium cations in the reaction mixture shifts the normal crystallization equilibrium of faujasite to zeolite P toward ZSM-4. Additionally, the crystallization of synthetic faujasite is hastened by the inclusion of tetramethylammonium ion in the reaction mixture. Thus, by following the above-outlined procedure, both faujasite and ZSM-4 can be synthesized sequentially from the same reaction mixture, the faujasite crystallizing in less time than it normally crystallizes in a reaction mixture which does not contain any tetramethylammonium ions therein.

ZSM-4 is a designation used to identify a family of zeolites whose compositions can be expressed in terms of mole ratios of oxides as follows:

$$0.9 \pm 0.2 M_{\frac{2}{n}}O : W_2O_3 : 3\text{-}20\,YO_2 : zH_2O$$

wherein M is a cation, $n$ is the valence of said cation, W is selected from the group consisting of aluminum and gallium, Y is selected from the group consisting of silicon and germanium, and $z$ is from 0 to 20. In the as synthesized aluminosilicate form the zeolite has a formula, in terms of mole ratios of oxides, as follows:

$$0.9 \pm 0.2 M_{\frac{2}{n}}O : Al_2O_3 : 3\text{-}20\,SiO_2 : zH_2O$$

and M is selected from the group consisting of a mixture of tetramethylammonium cations and alkali metal cations, especially sodium. The original cations can be at present so that the amount of tetramethylammonium cations is between 1 and 50 percent of the total amount of the original cations. Thus, the zeolite can be expressed by the following formula, in terms of mole ratios of oxides:

$$0.9 \pm 0.2[xR_2O + (1-x)M_{\frac{2}{n}}O] : W_2O_3 : 3\text{-}20\,YO_2 : 0\text{-}20H_2O$$

where W and Y have the previously assigned significance, R is tetramethylammonium, M is an alkali metal cation and $x$ is between 0.01 and 0.50.

Members of the family of ZSM-4 zeolites possess a definite distinguishing crystalline structure whose X-ray diffraction pattern has the following values:

TABLE 1

| Interplanar Spacing $d$(A) | Relative Intensity |
|---|---|
| 9.1 ± 0.2 | vs |
| 7.94 ± 0.1 | mw |
| 6.90 ± 0.1 | m |
| 5.97 ± 0.07 | s |
| 5.50 ± 0.05 | mw |
| 5.27 ± 0.05 | mw |
| 4.71 ± 0.05 | mw |

| | | |
|---|---|---|
| 4.39 | ± 0.05 | w |
| 3.96 | ± 0.05 | w |
| 3.80 | ± 0.05 | s |
| 3.71 | ± 0.05 | m |
| 3.63 | ± 0.05 | m |
| 3.52 | ± 0.05 | s |
| 3.44 | ± 0.05 | m |
| 3.16 | ± 0.05 | s |
| 3.09 | ± 0.05 | m |
| 3.04 | ± 0.05 | m |
| 2.98 | ± 0.05 | m |
| 2.92 | ± 0.05 | s |

These values were determined by standard techniques. The radiation was the K-alpha doublet of copper, and a Geiger counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and $d$ (obs.), the interplanar spacing in A., corresponding to the recorded lines, were calculated. In Table 1 the relative intensities are given in terms of the symbols $s$ = strong, $m$ = medium, $ms$ = medium strong, $mw$ = medium weak and $vs$ = very strong.

In the process of the present invention, the reactants comprise sources of silica, alumina and alkali metal oxide which are mixed in a manner to effectuate production of a crystalline aluminosilicate after which a source of tetramethylammonium oxide is introduced into the crystallization environment. In the process of the invention, water-soluble sources of silica are employed such as silicic acid and alkali metal silicates, such as, for example, sodium silicate and sodium metasilicate. These sources of silica are highly desirable since in accordance with the preferred method of this method easily pumpable aqueous media can be produced therefrom from which synthetic faujasite or ZSM-4 can be crystallized. Additionally, colloidal silica can be employed as a source of silica. It has been found in this regard that the source of silica has little effect upon the equilibrium crystallization products obtained and additionally no perceptible difference in the kinetic rates of crystal formation is observed when comparing preparations employing sodium silicate and colloidal silica in aqueous solutions.

Sources of alumina which can be prepared in the present invention include water-soluble aluminum salts such as aluminum sulfate, aluminum chloride, aluminum acetate and sodium aluminate.

The alkali metal oxide content is suitably provided in the form of an alkali metal hydroxide either in solid form or in aqueous solution. At least a portion of the alkali metal content can be provided employing sodium in the form of sodium silicate which also supplies at least a portion of the silica content required.

The tetramethylammonium ion content can be supplied in the form of tetramethylammonium chloride or tetramethylammonium hydroxide in an aqueous solution or another solution such as an alcoholic solution.

According to the preferred method of the present invention, a precursor is formed containing silica, alumina and water in the following mole ratios:

| | |
|---|---|
| $SiO_2/Al_2O_3$ | 2 to 40 |
| Alkali Metal Oxide/Silica | 1 to |
| $H_2O$/Alkali Metal Oxide | 10 to 60 |

The precursor is formed by heating the mixture. To this mixture is added additional sodium oxide, alumina, silica and water and a source of tetramethylammonium cation. The hydrogel so prepared is then subjected to the proper conditions of time and temperature to facilitate crystallization. After the mixture is formed into a hydrogel, it can be aged at room temperature for a period of time or it can be treated immediately with a source of tetramethylammonium cation to facilitate crystallization of synthetic faujasite, and ZSM-4 from the resultant mixture. Aging of the hydrogel form prior to crystallization is not deleterious although it is generally desirable to proceed with the zeolite synthesis immediately after the hydrogel is formed by adding thereto the minor amount of a source of tetramethylammonium and commencing crystallization.

After the source of tetramethylammonium cations is added to the silica, water, alumina, and alkali metal oxide, crystallization is effected. Crystallization can be carried out at a temperature of from room temperature to about the boiling point of the aqueous crystallization mixture under the prevailing pressure for a period of time generally between about 1 and 240 hours with time being an inverse function of temperature. In crystallizing zeolites from the crystallization environment, synthetic faujasite is first crystallized. This is normally followed by subsequent crystallization of ZSM-4 from the same crystallization environment. The normal metamorphosis tending toward the crystallization of zeolite P from faujasite is shifted to favor ZSM-4 synthesis.

After the synthetic faujasite is crystallized, it is separated from crystallization environment and dried. Normally it is washed several times to remove any entrained material therefrom. The synthetic faujasite is generally washed until the wash filtrate stabilizes to a pH of about 11. The same treatment is performed on ZSM-4 when it crystallizes from the crystallization environment.

Crystallization of the zeolites can be accomplished in a quiescent reaction zone or under conditions of agitation. Conditions of agitation are preferred as they facilitate and expedite the crystallization of the desired zeolite. Thus, in some instances, agitation of a crystallization reaction mixture causes ZSM-4 crystallization from a reaction mixture in less time than provided by quiescent crystallization from a reaction mixture otherwise the same, but containing twice the amount of tetramethylammonium oxide. Naturally, the use of a large amount of tetramethylammonium oxide together with agitation during the crystallization subsequently expedites the zeolite crystallization.

In the examples below, the percent crystallinities are expressed. The percent crystallinity for faujasite was determined by comparing under X-ray analysis the peak height at two theta of 33.65 of the sample with a faujasite marketed under the name Linde 13 X. The percent crystallinity is equal to:

$$\frac{\text{peak height of sample}}{\text{peak height of standard}} \times 100 \text{ percent}$$

The percent crystallinity for ZSM-4 was determined by comparing the X-ray diffraction pattern peak heights of the sample against the X-ray diffraction pattern of a standard at the following peak heights: 9.4±0.1, 14.6±0.1, 18.6±0.1, 23.2±0.1, 25.1±0.1, 28.0±0.1 and 30.4±0.1. The percent crystallinities at each peak height is equal to:

$$\frac{\text{peak height of the sample}}{\text{peak height of the standard}} \times 100 \text{ percent}$$

The peak height percentages are averaged to determine the percent crystallinity for the ZSM-4 reported above.

The ZSM-4 standard was prepared by first forming four solutions identified as A, B, C and D as follows:

| | | |
|---|---|---|
| Solution A: | | |
| Sodium aluminate | 19.2 | g. |
| Sodium hydroxide pellets | 154.4 | g. |
| Sodium silicate | 275.2 | g. |
| Water | 612 | g. |
| Solution B: | | |
| Sodium silicate | 1,925 | g. |
| Water | 1,375 | g. |
| Solution C: | | |
| Aluminum chloride | 150 | g. |
| Water | 1,300 | g. |
| Solution D: | | |
| Tetramethylammonium hydroxide as 10 percent aqueous solution | 240 | g. |

Solution A was prepared by dissolving the NaOH and aluminate in water, adding the silicate, and heating the resulting clear solution at 60° C. for 0.5 hour. It had the following composition, in terms of mole ratios of oxides:

| | |
|---|---|
| $Na_2O/SiO_2$ | 1.85:1 |
| $SiO_2/Al_2O_3$ | 16:1 |
| $H_2O/Na_2O$ | 18:1 |

Solution A was added to Solution B in a Waring Blender, mixed for 5 to 10 minutes at reduced speed, and then Solution C was added rapidly, with stirring continued for about 1 minute. The resulting slurry was heated at 100° C. for 0.5 hour and filtered. Solution D was thoroughly mixed with the filter cake and the mixture heated at 100° C. for 3 days. The crystals which appeared were filtered and washed until the washings had a pH below 11, and dried at 110° C. for 3 hours. The ZSM-4 had the following composition, in terms of mole ratios of oxides:

$$0.15[(CH_3)_4N]_2O : 0.91\ Na_2O : Al_2O_3 : 6.7\ SiO_2$$

EXAMPLE 1

A crystallization reaction mixture was formed by first forming three solutions identified below:

TABLE 2

(Starting Formulations)

| | |
|---|---|
| Precursor | |
| Colloidal silica, g. | 261.44 |
| $NaAlO_2$, g. | 19.2 |
| NaOH (98%), g. | 185.7 |
| $H_2O$, g. | 593.7 |
| Silicate Solution | |
| Colloidal Silica, g. | 1,045.0 |
| NaOH, g. | 174.8 |
| $H_2O$, g. | 731.7 |
| Acid Alum | |
| $Al_2(SO_4)_3 \cdot 14\ H_2O$, g. | 190.4 |
| $H_2SO_4$ (98%), g. | 80.0 |
| $H_2O$, g. | 1,480 |

The precursor solution was prepared, heated for one-half hour at 60° C. and mixed into the silicate solution to which was subsequently added the acid alum solution. The combination mixtures were blended together in a Waring Blender forming a gel and were divided into eight approximately equal portions having a volume of about 1 pint. Four of the 1-pint samples were aged in gel form for 13 days after which to each was added the below-indicated amount of tetramethylammonium chloride. The samples were then put into a crystallizer maintained at about 100° C. and the crystals which precipitated after the indicated times in Table 3 below were analyzed. Analysis revealed the zeolites indicated in the table wherein F means faujasite and P refers to zeolite P.

TABLE 3

X-ray Analysis of Faujasite-ZSM-4-P Metamorphosis

| Preparation identification | Gel age, days | 50% TMACl g./500 g. gel | Crystallization time | Zeolite type | Percent cryst. |
|---|---|---|---|---|---|
| A | 13 | .75 | 23 hours | F | 80 |
| | | | 13 days | ZSM-4+F+P | |
| B | 13 | 2.25 | 23 hours | F | 80 |
| | | | 13 days | ZSM-4 | 120 |
| C | 13 | 3.75 | 23 hours | F | 65 |
| | | | 13 days | ZSM-4+trace P | 145 |
| D | 13 | 7.5 | 23 hours | F | 55 |
| | | | 13 days | ZSM-4 | 160 |

The above indicates that the amount of tetramethylammonium chloride had definitely affected the metamorphosis shift of faujasite to zeolite P in favor of ZSM-4 synthesis.

EXAMPLE 2

In a manner similar to Example 1, three solutions were prepared in the amounts indicated below:

TABLE 4

Starting Formulations

| | |
|---|---|
| Precursor | |
| Sodium silicate, g. | 275.2 |
| $NaAlO_2$, g. | 19.2 |
| NaOH (98%), g. | 154.4 |
| $H_2O$, g. | 611.2 |
| Silicate Solution | |
| Colloidal silica, g. | 1,045.0 |
| NaOH, g. | 174.8 |
| $H_2O$, g. | 731.7 |
| Acid Alum | |
| $Al_2(SO_4)_3 \cdot 14\ H_2O$, g. | 190.4 |
| $H_2SO_4$ (98%), g. | 80.0 |
| $H_2O$, g. | 1,480.0 |

The precursor solution was heated for one-half hour at 60° C. and then mixed into the silicate solution to which was subsequently added to acid alum solution. The combination of mixtures was blended together into a Waring Blender forming a gel and divided into equal portions each having a volume of about 1 pint. Three of the 1-pint samples were aged in gel form for 11 days after which to each was added the below-indicated amounts of tetramethylammonium chloride. The samples were put into a crystallizer maintained at about 100° C., precipitated and the crystals which after the indicated times in Table 5 were analyzed. Analysis revealed the zeolites indicated in the table wherein F means faujasite and P refers to zeolite P.

TABLE 5

X-ray Analysis of Faujasite-ZSM-4-P Metamorphosis

| Preparation identification | Gel age, days | 50% TMACl g/500 g. gel | Crystallization time | Zeolite type | Percent cryst. |
|---|---|---|---|---|---|
| A | 11 | .75 | 45 hours | F | 80 |
| | | | 7 days | F+trace ZSM-4 | 70 |
| | | | 15 days | ZSM-4+P | 45 |
| B | 11 | 2.25 | 45 hours | F | 75 |
| | | | 7 days | ZSM-4+P | ¹ Indet. |
| | | | 15 days | ZSM-4+P | 100 |
| C | 11 | 3.75 | 45 hours | F | 75 |
| | | | 7 days | ZSM-4+P | 145 |
| | | | 15 days | ZSM-4+P | 145 |

¹ Probably less than 15-day sample.

NOTE.—Crystallinities reported above apply only to faujasite or ZSM-4. No quantitative crystallinity determinations were made for zeolite P.

The above indicates that the amount of tetramethylammonium chloride added to the reaction mixture definitely affected the metamorphosis shift of faujasite to zeolite P in favor of ZSM-4 synthesis.

EXAMPLE 3

In order to prove that the use of a source of tetramethylammonium ion increases the rate of crystallization of faujasite in a faujasite reaction mixture, two comparable reaction mixtures were prepared having the following ratios, in terms of mole ratios of oxides:

10.81 $Na_2O$ : $Al_2O_3$ : 15.33 $SiO_2$ : 507.60 $H_2O$

The reaction mixtures were formed by initially preparing three separate solutions having the compositions expressed in Table 4. The precursor solution was mixed into the silicate solution to which was subsequently added the acid alum solution. The combination solutions were mixed in a Waring Blender Two 1-pint portions were withdrawn and designated Sample A and Sample B. To the portion of Sample B was added 15 grams of a 50 percent by weight tetramethylammonium chloride solution for each 500 grams of gel obtained from the mixing. Each sample was maintained at 100° C. and observed until crystals formed. After about 12½ hours, faujasite crystals formed from the reaction mixture of Sample B. No crystals formed in the case of Sample A until 24 hours had elapsed. At that time, faujasite crystals appeared in the reaction mixture. Each sample was maintained at 100° C. until further crystals formed. After 11 days, crystals of ZSM-4 precipitated from Sample B having an exceptionally high degree of crystallinity. Crystals precipitated from Sample A 18 days after the commencement of the heating which crystals were analyzed and found to be crystals of zeolite P. No zeolite P crystals were uncovered from the reaction mixture of Sample B. This indicates that not only does the presence of tetramethylammonium ions increase the crystallization rate of faujasite, but such ions can work a complete metamorphosis change to favor ZSM-4 synthesis, precluding crystallization of zeolite P. Thus, the method of the present invention provides a plurality of valuable zeolites which are particularly useful in catalysis. The zeolite synthesis is characterized by a shorter crystallization period than provided by heretofore-known techniques. Thus, the present invention is suited for large-scale synthesis of these zeolites, especially in catalyst plants servicing petroleum refineries.

The terms and expressions used herein are used for purposes of description and not of limitation, as there is no intention, in the use of such terms and expressions, of excluding any equivalents or portions thereof, as many modifications and departures are possible within the scope of the invention claimed.

I claim:

1. A method for the production of synthetic faujasite which comprises initially forming a precursor comprising a mixture of silica, alumina, water and alkali metal oxide having a composition, expressed in terms of mole ratios of oxides, as follows:

| | |
|---|---|
| $SiO_2/Al_2O_3$ | 2 to 40 |
| Alkali Metal Oxide/$SiO_2$ | 1 to 4 |
| $H_2O$/Alkali Metal Oxide | 10 to 60 | heating the mixture, thereafter adding thereto a source of tetramethylammonium cations, sodium oxide, silica, alumina and water such that the ratios are:

| | |
|---|---|
| $SiO_2/Al_2O_3$ | 3 to 60 |
| $\dfrac{R_2O + \text{alkali metal oxide}}{SiO_2}$ | .05 to .90 |
| $\dfrac{H_2O}{R_2O + \text{alkali metal oxide}}$ | 15 to 600 |
| $\dfrac{\text{Alkali metal oxide}}{\text{Alkali metal oxide} + R_2O}$ | 0.31 to <1 | wherein R is tetramethylammonium, effecting crystallization of synthetic faujasite from the resultant mixture, separating essentially pure synthetic faujasite from the reaction mixture and recovering the same.

2. A method according to claim 1 wherein the amounts of silica, alumina, $R_2O$, alkali metal oxide and water are within the following ranges, expressed in terms of mole ratios of oxides:

| | |
|---|---|
| $\dfrac{SiO_2}{Al_2O_3}$ | 6 to 30 |
| $\dfrac{R_2O + \text{Alkali metal oxide}}{SiO_2}$ | .15 to .75 |
| $\dfrac{H_2O}{R_2O + \text{Alkali metal oxide}}$ | 20 to 150 |
| $\dfrac{\text{Alkali metal oxide}}{\text{Alkali metal oxide} + R_2O}$ | .75 to .99 |

3. A method according to claim 2 wherein the alkali metal oxide is sodium oxide.

4. A method according to claim 2 wherein at least a portion of the silica is supplied by colloidal silica.

5. A method according to claim 2 wherein at least a portion of the silica is supplied by sodium silicate.

6. A method according to claim 2 wherein the reaction mixture is agitated during crystallization.

* * * * *

PO-1050
(5/69)

UNITED STATES PATENT OFFICE
CERTIFICATE OF CORRECTION

Patent No. 3,642,434      Dated February 15, 1972

Inventor(s) Francis G. Dwyer

It is certified that error appears in the above-identified patent and that said Letters Patent are hereby corrected as shown below:

Column 3, line 65      "Oxide/Silica   1 to   " should read --Oxide/Silica   1 to 4--

Signed and sealed this 6th day of June 1972.

(SEAL)
Attest:

EDWARD M. FLETCHER, JR.
Attesting Officer

ROBERT GOTTSCHALK
Commissioner of Patents